United States Patent [19]
Tanaka et al.

[11] Patent Number: 5,804,238
[45] Date of Patent: Sep. 8, 1998

[54] PARTIALLY DENATURED YOLK OBTAINED BY HEATING THE YOLK AND AN EMULSIFIER MADE FROM SAID YOLK

[75] Inventors: Mitsuharu Tanaka; Kenji Ikeda; Fumiko Irie; Kazunori Kikuchi; Hiroshige Kohno, all of Tokyo, Japan

[73] Assignee: Asahi Denka Kogyo Kabushikikaisya, Tokyo, Japan

[21] Appl. No.: 771,989

[22] Filed: Dec. 23, 1996

[30] Foreign Application Priority Data

Dec. 28, 1995 [JP] Japan ................................. 7-343357
Dec. 28, 1995 [JP] Japan ................................. 7-343358

[51] Int. Cl.$^6$ ................................. A23L 1/32; A23L 1/24; A23D 7/005
[52] U.S. Cl. ..................... 426/244; 426/604; 426/605; 426/613; 426/614; 426/520
[58] Field of Search ................................. 426/604, 613, 426/614, 605, 520, 244

[56] References Cited

PUBLICATIONS

Rombauer, IS et al. Egg dishes. in Joy of Cooking. Rombauer et al, eds. Scribner, New York, 1975.

*Primary Examiner*—David Saunders
*Assistant Examiner*—F. Pierre VanderVegt
*Attorney, Agent, or Firm*—Sherman and Shalloway

[57] ABSTRACT

A partially heat denatured yolk prepared by heating a yolk fluid at the temperature from 65° C. to 70° C. and maintaining the said temperature for 5 minutes or more, which can improve the flavour, features and functions of yolk. The said partially heat denatured yolk can be prepared by heating by applying an electric current to the yolk. Further, an emulsion prepared by processing 30–95 weight parts of the partially heat denatured yolk together with 5–70 weight parts of oils and fats to obtain an O/W type emulsion can be used as an emulsifier. The emulsifying ability of said emulsifier can be improved by adding vinegar or acetic acid and/or salt.

22 Claims, 4 Drawing Sheets

PARTIALLY DENATURED YOLK OBTAINED BY HEATING THE YOLK AND AN EMULSIFIER MADE FROM SAID YOLK

FIELD OF THE INVENTION

This invention relates to a partially heat denatured yolk of which flavor, feature and function are improved. The invention in more detail relates to a partially denatured yolk obtained by beating the yolk which is suitable as an additive material for various kinds of processed food or as an additive for foods applied to the improvement of flavor or to the functional improvement of foods, and the method for preparation thereof. And also this invention relates to an emulsifier mainly used for the preparation of emulsified foods by emulsifying the partially heat denatured yolk with oils and fats to obtain O/W type emulsion.

DISCLOSURE OF THE PRIOR ART

Usually, various kinds of food additives made from yolk are known as materials of processed foods. And when yolk is used as foods or food additives, yolk is variously processed. For instance, a processed yolk including a high concentration of sugar or salt for the purpose to improve the preservation are widely known. Further, an enzyme treated yolk which looses a thermocoagulating feature or a dryed yolk are also well known. However, if these processed yolk are applied as food additives, the problems referring to the taste or flavour occur. That is, the yolk with sugar or salt has a restriction for their application originated in their taste, and also the enzyme treated yolk has problems not only due to decomposition smell but also due to bitter and acrid taste. Further, since the yolk taste and flavour of the dried yolk disappear during the drying procedure, the range for an application becomes very narrow.

On the other hand, it is well known that to denature a yolk by heat treatment and to use the denatured yolk in foods. For instance, in the preparation of emulsion type dressing using yolk and xanthan gum, a method to prevent the gellation of the product by the effect of xanthan gum and yolk while preserved by using a denatured yolk by heat treatment by means of a double wall oven, a heat exchanger, a plate heater or a hot kneader heated to the temperature of 70°–100° C. for whole part or for a part of the yolk is proposed (Japanese Patent Publication 49393/1992). And food additives whose preservability is improved by complete denaturation of a mixture of yolk and saccharoid with heat treatment at the temperature higher than 70° C. are proposed (Japanese Patent Publication 23778/1984). These conventional methods which use a heat denatured yolk for the food application are intending to remove the various defects of yolk by complete heat denaturation of the yolk by means of heat treatment at the temperature higher than 70° which is a heat coagulation point of yolk.

Further, yolk includes phospholipid or cholesterin of which the main components are lipoprotein and resitin, and these components have an emulsifying power especially suited for the preparation of the O/W type emulsion. Therefore, the yolk solution is applied as an emulsifier for the preparation of emulsified foods such as mayonnaise, custard cream, flour paste and whip cream. However, for the preparation of emulsified foods using an emulsifying power of yolk, a large quantity of yolk is necessary because the emulsifying power of yolk is not so strong, and consequently there is a problem that the yolk flavour is added to the foods. Furthermore, recently, for the O/W type emulsified foods such as mayonnaise, a feature of emulsion stability are becoming very important. That is, the stabilized state of emulsion must be maintained even if it is heated or frozen, and this is a requirement intending a further development of a frozen food or a retort food which must be sterilized by heat treatment.

For the solving of said problems, recently it become popular to decompose yolk with an enzyme such as lipase or protease and to use it as an emulsifier, however the enzyme decomposed yolk has an odor of decomposition and has a tendency to have a bitter and acrid taste, and so the foods which use the enzyme decomposed yolk have a defect of degraded taste.

OBJECT OF THE INVENTION

An object of this invention is to provide a partially heat denatured yolk whose flavour, characteristics and function are improved, and the said partially heat denatured yolk is prepared not by being denatured completely but by controlling a yolk fluid at partially denatured condition. Further, an another object of this invention is to provide an emulsifier whose emulsifying power is improved by applying the fact that an emulsifying ability of said partially denatured yolk is remarkably improved.

BRIEF SUMMARY OF THE INVENTION

The inventors of this invention conducted an intensive study and found that the following interesting results can be obtained by heating a yolk fluid at specific temperature and for specific period of time so as to maintain the yolk fluid at partially denatured condition. Accordingly, a state of the yolk fluid is changed to a paste state maintaining it's water solubility, and the flavour of yolk remarkably becomes vigorous. Further a masking function to an odor generated from fishes or animals is remarkably improved, and an emulsifying function is also remarkably intensified. That is, this invention relates to a partially heat denatured yolk characterized by heating a yolk fluid at the temperature from 65° C. to 70° C. and maintaining the said temperature for 5 minutes or more.

Further, the inventors of this invention found that the emulsifying ability of the partially heat denatured yolk fluid is remarkably improved by processing it to an O/W type emulsion with oils and fats. This invention is based on these facts. That is, the present invention relates to an emulsifier prepared by processing 30 to 95 weight parts of partially denatured yolk obtained by maintaining a yolk fluid at the temperature of 65° C. to 70° C. for 5 minutes or more together with 5 to 70 weight parts of oils and fats to an O/W type emulsion.

BRIEF DESCRIPTION OF DRAWINGS

These and objects as well as advantages of the present invention will become clear by the following description of preferred embodiments of the present invention with reference to the accompanying drawings, wherein.

DETAILED DESCRIPTION OF THE INVENTION

Figure 1:
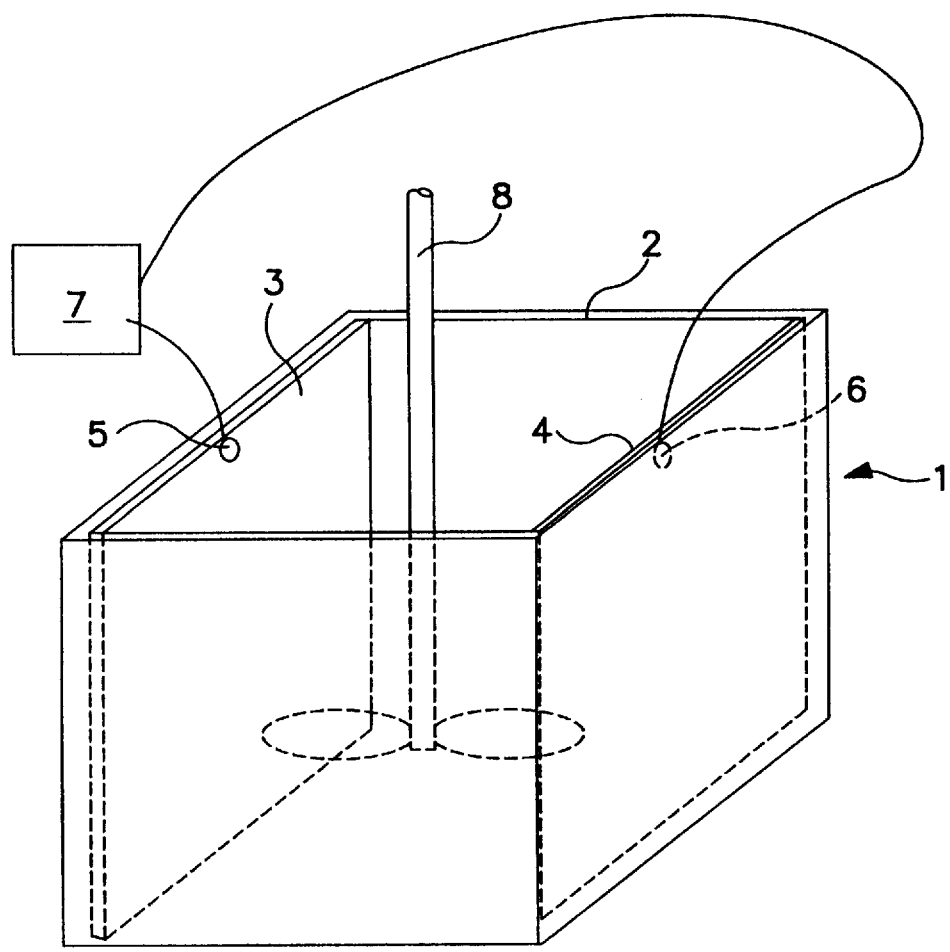
FIG. 1 is a perspective view of apparatus of a for providing an electric current by use in this invention.

The objects, features and advantages of this invention will appear more fully from the following description. In this invention, raw yolk can be generally used. The said raw yolk means the yolk from which egg white is separated after the egg shell is broken. Eggs of a hen, a quail and a duck or others can be used in this invention.

In the present invention, a yolk fluid is heated at the temperature of 65° C. to 70° C. The more desirable temperature range is from 66° C. to 68° C. The partially denatured state can not be formed at the temperature lower than 65° C., and when a yolk fluid is heated at the temperature higher than 70° C. the yolk fluid is denatured and completely coagulated for the preparation of the partially denatured yolk, not only a final temperature but also a period of time to maintain the temperature is very important. The necessary period of time to maintain the heating temperature is 5 minutes or more, and desirably from 5 to 30 minutes. By heating for a shorter period of time than 5 minutes, a denaturation of yolk fluid is not sufficient, and by heating by a longer period of time than 30 minutes causes an undesirable color change to dark and also is not efficient.

For instance, raw yolk of a hen includes about 51% of water, about 15% of protein, about 31% of lipid and about 3% of other ingredients. Yolk fluid itself is a fluid having a flowability, and it coagulates and changes to a solid by heating and becomes water insoluble. The partially denatured yolk of this invention is a yolk of which state is changed from a flowable fluid to a paste and increases it's viscosity while maintaining a feature of water solubility. The said yolk can be prepared by heating a yolk at a temperature of 65° C. to 70° C. for 5 minutes or more. It is possible to control the change which cause a coagulation and a water insolubility by maintaining a yolk fluid in the temperature range above mentioned. That is, by controlling the temperature, a yolk fluid can be partially denatured and becomes a paste state having water solubility.

The partially denatured yolk of this invention can be explained as follows. By heating a raw yolk at the temperature of 65° C. to 70° C. for 5 minutes or more, the specific components such as protein which can be denatured completely within said range of the temperature are denatured completely. The yolk whose specific protein alone is denatured becomes a water soluble viscous paste having a viscosity of 1500–7500 centipoise at 65°–70° C. (Visco tester, Lion Co., ltd. measured by No. 1 rotar). The flavour of this partially heat denatured yolk is remarkably intensified and consequently a masking function of an odor generated from fishes or animals is remarkably improved. Furthermore an emulsifying function is also remarkably improved. It is most important to heat a yolk fluid at the temperature of 65° C. to 70° C. for 5 minutes or more to denature the yolk so as to be a state of paste without hurting a feature of water solubility.

For the preparation of partially heat denatured yolk, an autoclave, an heat exchanger, a plate heater or hot kneader can be mentioned as a heating means. However, since the feature of yolk fluid is characterised as viscous and low heat conductivity, a problem of partial heat unevenness arises when above mentioned heating apparatuses are used. And consequently, it is very difficult to maintain a yolk fluid homogeneously at the temperature of 65° to 75° C. for a certain period of time and produce a homogeneous product in large quantities. The preferable means for the mass production in an industrial level of the partially heat denatured yolk is a heating by applying an electric current to the yolk. That is, the electric current is directly applied to a yolk fluid to heat the yolk fluid by a Joule heat generated by the applied electric current.

Generally, an initiating temperature for the yolk coagulation by heat is around 62° C. The yolk is finally completely heat denatured and coagulated when it is heated higher than this temperature. In the present invention, the method of applying an electric current directly to the yolk is preferably used, which satisfy the condition to heat a yolk fluid at the temperature of 65° to 75° C. which is in excess the initiating temperature for the yolk coagulation and maintain this temperature for 5 minutes or more. As above mentioned, it is difficult to maintain a homogeneous and constant heating by any other heating means except the direct application an electric current. When the yolk fluid is heated by the conventional method, the problems of uneven remaining of undenatured portion or a complete denatured portion and coagulated portion are pointed out and the object to denature only specific protein can not be accomplished, that is, the partially denatured state of this invention can not be accomplished.

In the heating method of this invention of the direct application of an electric current, it is important to maintain the temperature of 65° to 70° C. for more than 5 minutes, and it is desirable to stir the yolk fluid during the heating process for the purpose to reduce the uneven heating. The partially denatured state can not be accomplished within less than 5 minutes. Further, if the heating process is carried out in a closed system where the water component in the yolk fluid is not vaporized or dispersed, the partially denatured state can be maintained even if the heating is continued for several hours. From the view point of good productivity, it is desired to maintain the heating temperature from 5 to 30 minutes. Since the partially heat denatured yolk obtained by means of the present invention of directly applying an electric current obtains a water soluble homogeneous paste state without including small coagulated particles generated by uneven denaturation, it is not necessary to be filtrated by a screen and has a good solubility to water.

Figure 2:
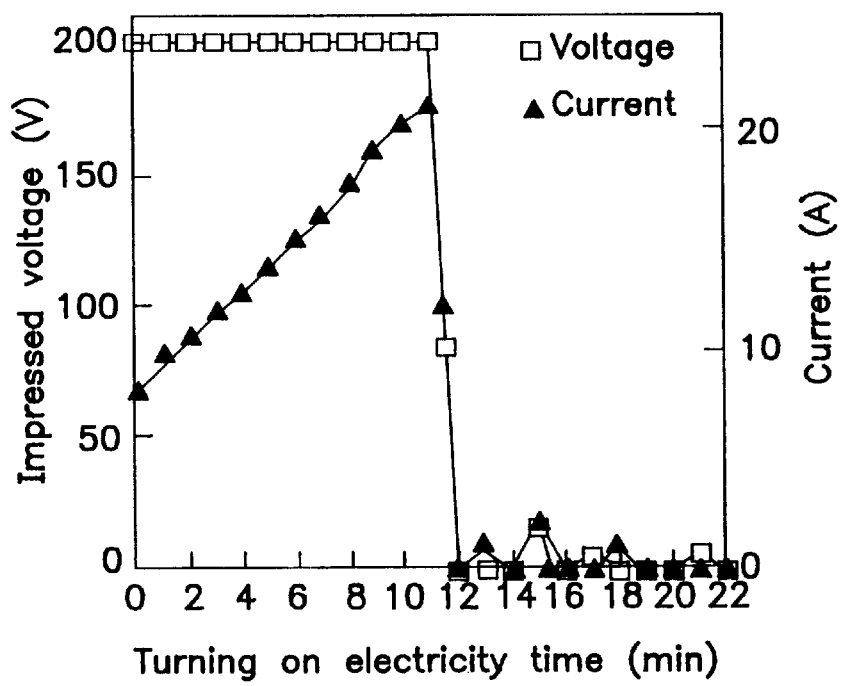
FIG. 2 is a drawing showing a relationship between lapse of time and impressed voltage and also current used during application of an electric current.
Figure 3:
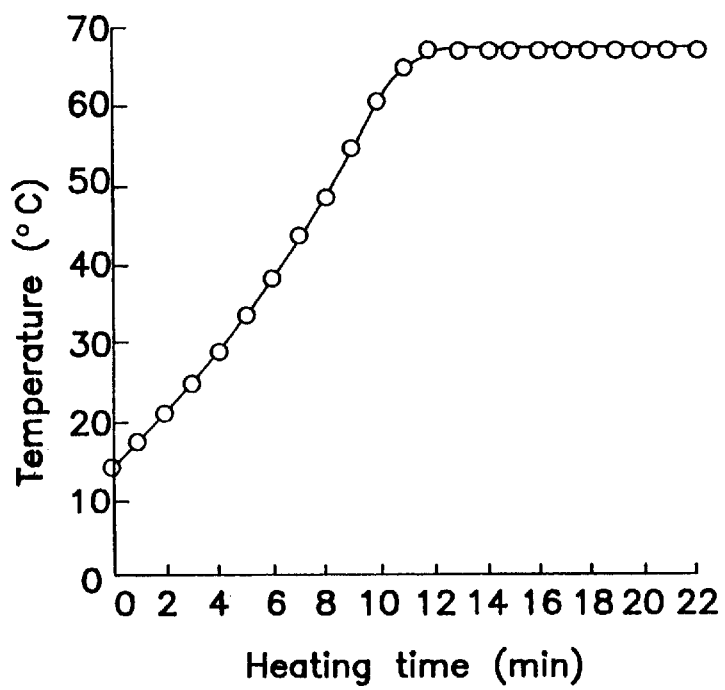
FIG. 3 is a curve of temperature increase of a yolk fluid during an experiment obtained by the application of an electric current.
Figure 4:
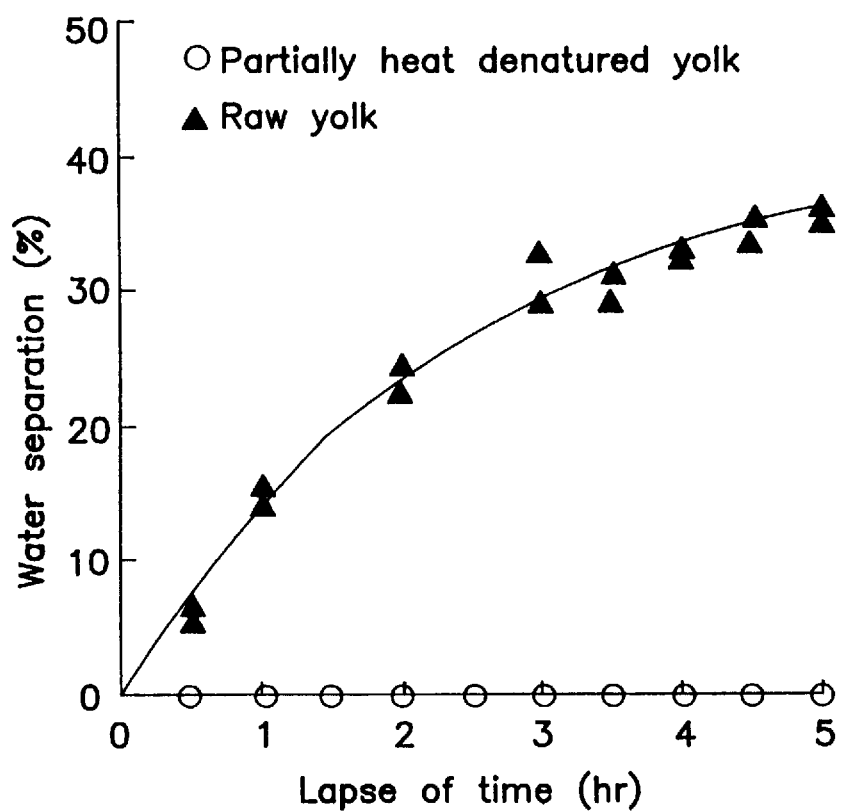
FIG. 4 illustrates an emulsifying feature of the partially heat denatured yolk of the present invention.
Figure 5:
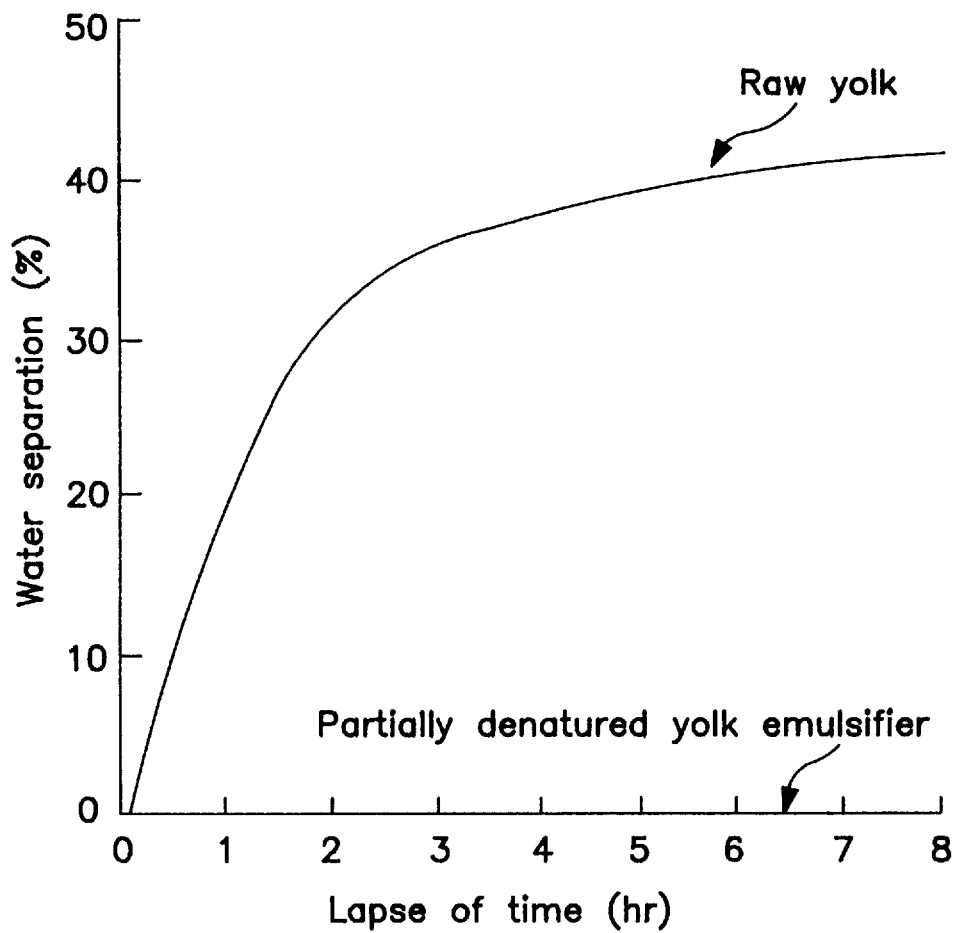
FIG. 5 illustrates an emulsifying feature of the emulsifier of this invention when the partially heat denatured yolk is emulsified with oils and fats.

The attached drawings are briefly discussed below. FIG. 1 is a perspective view of an apparatus used for directly applying an electric current in accordance with this invention. FIG. 2 is a drawing showing a relationship between lapse of time and an applied voltage and an applied current. FIG. 3 shows a curve of temperature raising of a yolk fluid. FIG. 4 illustrates an emulsifying feature of the partially heat denatured yolk of the present invention. FIG. 5 illustrates an emulsifying feature of the emulsifier of this invention in which the partially heat denatured yolk is emulsified with oils and fats.

FIG. 1 is a prespective view of one example of an apparatus illustrating the dried application of an electric current to yolk flush. In the drawing, 1 indicates an apparatus for directly applying an electric current, and 2 indicates a chamber composed of an insulator such as synthetic resin or glass, whereof the shape is not limited, but desirably is a rectangular shape or a cube shape. A chamber cover made of insulator is provided if necessary. To the opposite two inner surfaces of the chamber 2, a plate of electrode 3 and 4 are installed. As the electrode 3 and 4, for instance, a titanium plate to the surface of which thin layer of ceramic is dispersed can be used. And these plates of electrode 3 and 4 are connected to a power source 7 through a terminal 5 and 6 of each electrode. Stem 8 indicates a stirrer. As the chamber 2 of this apparatus, a rectangular shape or a cubic shape chamber can be used of which one opposite pair surface are composed by the electrodes whose outer surface are covered by an insulator and another opposite pair surface and bottom surface are composed by the insulator. As a stirrer 8, various types, e.g. propeller type can be voluntarily used. By installing the stirrer 8 in the chamber 2, a more homogeneous heating effect can be expected.

A yolk fluid is poured into the chamber 2, and for instance the electrode 3 is used as an anode and the electrode 4 is used as a cathode, then a voltage is charged so as to directly apply an electric current. By the direct application of an electric current, a Joule heat is generated in the yolk fluid, and the temperature of the yolk fluid increases by itself. The temperature of yolk fluid can be controlled by controlling voltage and current. To obtain good control, it is desirable to control the voltage and the flow rate of current automatically by feeding back to the voltage and cannot control means the temperature of the yolk. By means of this method, it becomes possible to raise the temperature to 65°–70° C. quickly and to maintain said temperature homogeneously and consequently makes it possible to obtain a partially heat denatured yolk of homogeneous quality. The value of voltage and current is not restricted, however, it is desirable to use a current which does not result in an electrolysis.

The partially heat denatured yolk of this invention, has a better flavour than a raw yolk and a masking effect for an odor generated from fishes or animals is remarkably improved, therefore it can be effectively applied as a material for various kinds of processed foods, and as a food additives for improving a flavour or a function.

The partially heat denatured yolk of this invention has a problem of preservability. To improve the preservability, it is possible to add vinegar or acetic acid, and especially vinegar is preferably used. The vinegar is used as a kind of food, mainly composed by volatile or not volatile organic acid such as acetic acid and subsidiaryly includes saccharoids, amino acids and esters and an aqueous fluid which has a fragrance and a deliciousness. It can be classified to a brewed vinegar and a synthetic vinegar. A brewed vinegar is produced by a brewing process of grains or fruits such as rices, apples or grapes. On the other hand, raw materials of a synthetic vinegar is glacial acetic acid. Both a synthetic vinegar and a brewed vinegar can be used in this invention. A preferable mixing proportion of vinegar or acetic acid by converting to pure acetic acid to the amount of said partially denatured yolk is more than 0.3 wt % and preferably more than 0.6 wt %. The mixing proportion is more preferably from 1 to 2 wt %. If the mixing proportion is smaller than 0.3 wt %, the effect of vinegar or acetic acid to the preservability is too weak, and if it is more than 4 wt %, the taste of acetic acid is too strong and adversely effects the flavour.

Further it is possible to add salt to the partially heat denatured yolk of this invention. By adding salt it become possible to improve the emulsifying power of the partially heat denatured yolk. As the salt to be added, both natural salt and sodium chloride can be mentioned, and the amount of salt to be added is 5–10 wt %. When an electrolyte such as salt or water is included in a raw yolk fluid, since an easy flow of electric current is permitted, it become possible to raise the temperature of the fluid to the desired temperature even if the voltage is low. On the other hand, since the electrical resistance of the fluid is decreased in inverse proportion to the current, it takes a very long time to arrive the desired temperature. Therefore, in the case of a heating of a yolk fluid is carried out by means of direct application of an electric current method, it is desirable to add vinegar, acetic acid or salt after a partially denaturation process of a yolk fluid is completed.

Further, the fluidity of a yolk fluid is improved and brings a feature of easy stirring by adding a cooking oil to a yolk fluid and processing to an O/W type emulsion, then partially denaturing the yolk fluid by heat treatment using the direct application of an electric current method maintaining the state of O/W type emulsion. Since a yolk fluid can be denatured maintaining a feature of solubility by using above mentioned method, the yolk fluid can be partially denatured in a higher efficiency. The amount of cooking oil to be added at the partially heat denaturation process is desirably smaller than 10 wt % based on the amount of yolk, however the current is not intended to be limited. The emulsion can be prepared by the mentioned method which prepare an emulsion by using the partially denatured yolk and a cooking oil.

The emulsifying function of the partially denatured yolk prepared as above is improved in comparison with a raw yolk fluid, and the emulsifying power of it can be further improved by processing it to an O/W type emulsion with cooking oil. That is, 30–95 wt % of above mentioned partially denatured yolk and 5–70 wt % of oils and fats are mixed together, and an emulsifier of O/W type emulsion is prepared. The obtained emulsion type emulsifier has an excellent emulsifying ability, and an O/W type emulsion which has a good stability to freezing or heating can be prepared. The proportional ratio of a partially denatured yolk is 30–95 wt %, desirably 50–70 wt %. When the proportional ratio of yolk is smaller than 30 wt %, since the total amount of oils and fats is too much and that of yolk is too small and is difficult to generate fine oil drops, an effect as a desirable emulsifier can not be expected. On the other hand, when the proportional ratio of yolk exceeds 95 wt %, the total amount of oils and fats is insufficient and the number of oil drops becomes too few. So it become very difficult to prepare an emulsion type emulsifier by emulsifying the yolk emulsifier.

As the oils and fats to be used in this invention, various kinds of animal oils or vegetable oils such as a soybeans oil, a rape-seed oil, a corn oil, a cotton-seed oil, a palm oil, a palm-seed oil, a fish oil, a lard, a tallow and a milk oil can be mentioned. And also hydrogenated or fractional oil of them can be used. Further, a mixed oil of solid fat and liquid oil can be use. And, when the proportional ratio of oils and fats is bigger than 40 wt %, it is desirable to use fats and oils having lower melting point, for instance, a liquid oil or solid oil having a melting point of about 35° C.

To improve the preservability of the emulsion type emulsifier of this invention, it is possible to add vinegar or acetic acid. As a vinegar or acetic acid, aforesaid vinegar or acetic acid can be used. A preferable mixing proportion of vinegar or acetic acid is more than 0.3 wt % and preferably more than 0.6 wt % of acetic acid concentration to the water content of said partially denatured yolk in said O/W emulsion type emulsifier. And the mixing proportion from 1 to 2% by weight is more preferably applied. If the mixing proportion is smaller than 0.3 wt %, the effect of vinegar or acetic acid to the preservability is too weak, and if it is bigger than 4 wt %, the taste of acetic acid is too strong and hurts the flavour.

Further, for the purpose of improving emulsifying power and stability, it is possible to add salt to the emulsion type emulsifier of this invention. By adding salt it become possible to improve the emulsifying power. As the salt to be added, both natural salt and sodium chloride can be mentioned. The amount of salt to be added is 2–20 wt % by NaCl concentration to the water content of the emulsifier of this invention. If the proportion is smaller than 2 wt %, an emulsifying power is not improved, and if it is bigger than 20% the flavour is hurt.

In the emulsion type emulsifier of this invention, it is important that the diameter of oil drops are finely granulated. Namely, desirably the average diameter of oil drops is smaller than 4 µm, and more desirably more than 50% of oil drops are smaller than 2 µm measured by the oil drop size distribution. When the average diameter of oil drops is bigger than 4 µm, a stability of emulsion prepared using this emulsifier is hurt, for instance, durability for freezing and defreezing or for heating.

The above mentioned emulsion type emulsifier of this invention is basically prepared by adding oils and fats to said partially denatured yolk with constant stirring so as to process it to an O/W type emulsion. If it is necessary to add vinegar or acetic acid and/or salt, it can be added from the initial stage or can be added after the partially denatured yolk and oil and fats are emulsified.

For the process to emulsify the partially denatured yolk and oil and fats, the partially denatured yolk is heated to the suitable temperature for emulsification, then oils and fats which is also previously heated to the suitable temperature for emulsification are added with constant stir. The most suitable emulsifying temperature is varied according to the melting point of oils and fats to be added, however, generally the temperature about 5° C. higher than the melting point of the oils and fats is desirable. In the case of liquid type oil such as salad oil, it is desirable to emulsify it at a room temperature or slightly lower temperature than the room temperature, after being homogenized by a homogenizing apparatus such as a homogenizer or a colloidal mill, then cooled.

Further, the fluidity of a yolk fluid is improved and brings a feature of easy stirring by adding a cooking oil beforehand to a yolk fluid and preparing an O/W type emulsion, then partially denaturing the yolk fluid by heat treatment using the direct application of an electric current method and maintaining the state of O/W type emulsion. Since a yolk fluid can be denatured while maintaining a feature of solubility by using above mentioned method, the yolk fluid can be partially denatured more efficiently. The amount of cooking oil to be added during the partially heat denaturation process is desirably less than 10 wt % based on the amount of yolk, however it is not intended to be limited. After the partially denatured yolk emulsion of lower oil proportion is prepared as above, remaining oil is added so as to balance the proportion of partially denatured yolk and oil to 30:90–70:5 and the emulsion type emulsifier of this invention can be obtained. According to said method, the process becomes slightly complicated because the oil to be added is divided into two portions and emulsified. However, the emulsifier prepared by this method has a better solubility and tends to have an feature of easy handling. The emulsion can be prepared using the above mentioned method which prepares an emulsion by using a partially denatured yolk and a cooking oil and also same oils and fats can be used.

The emulsifying function of partially denatured yolk prepared as above is improved in comparison with a raw yolk fluid, and the emulsifying power of it can be further improved by processing it to an O/W type emulsion with cooking oil. Therefore, the emulsifier of this invention has an excellent emulsifying effect and is especially suited as an emulsifier for emulsifying foods. An O/W type emulsion prepared by using this emulsifier has an excellent emulsion stability especially to heating and freezing.

EXAMPLES

The present invention will be more clearly illustrated from the following Examples.

Example 1

Eggs of hen are broken and yolk is separated from egg white. Viscosity of the obtained yolk fluid is lower than 30 centipoise. 10 kg of the yolk fluid is filled in a chamber 2 of an apparatus in which a direct electric current can be applied, as illustrated in FIG. 1. The chamber 2 is a cube shape having edges of 250 mm length assembled using a synthetic resin plate. To the opposite two inner surfaces of the chamber 2 there are installed electrodes 3 and 4 made of titanium plate to the surfaces of which a thin layer of ceramic is dispersed. As a power source 7, Superjoule 920 (product of Toyo Aluminium Ltd, maximum power is 200V×A) is used and voltage is impressed through a terminals 5 and 6 to the electrodes 3 and 4. Because the electric conductivity of yolk is varied with the temperature of yolk, the impressed voltage is controlled adjusting to the temperature, and also a voltage and a flow rate of current is controlled not to excel a maximum value of Superjoule 920.

FIG. 2 is a drawing indicating a relationship between lapse of time and impressed voltage and also a current. A voltage of 200 volt is impressed to a yolk fluid, and an electric current applied and with the laps of time the flow rate of current is increased. After 12 minutes, the temperature of yolk fluid is raised to 67° C. After that, for an additional ten minutes, that is time lapse from 12 to 22 minutes, this temperature is maintained by controlling the voltage. FIG. 3 shows the temperature change of a yolk fluid in this heating process. During the process of raising and maintaining the temperature, the yolk fluid is stirred at 200 rpm by a stirrer coated with fluoroplastics (200 mm diameter, propeller type). Consequently, a paste state partially heat denatured yolk having 2000 centi poise can be obtained.

The partially heat denatured yolk has a good flavour and is suited for masking the raw odor generated from fishes or animals.

Example 2

An emulsion is prepared by using the partially denatured yolk obtained by Example 1 and the stability of the emulsion is tested. A comparative experiment is carried out under the same conditions using raw yolk as a comparison.

According to the proportional ratio indicated in table 1, water is measured and salt is added and dissolved, then the partially denatured yolk is added and heated to the temperature of 50° C. To the obtained fluid, 10% vinegar and soybeans salad oil which is previously heated to 50° C. is added, then emulsified by means of a TK homo-mixer (Tokushu Kiko Industries Ltd.) at the rotating ratio of 400 rpm for 2 minutes. The obtained emulsion is immediately filled into 100 ml measuring cylinder and settled for 5 hours, and the water separation is observed.

A comparative experiment using the same procedure, except using raw yolk instead of a partially denatured yolk is carried out and the emulsion stability of the obtained emulsion is observed.

The test results are shown in FIG. 4. The emulsions prepared using raw yolk have a tendency to increase the amount of water separation (proportion ratio of water separation to the total amount %) with the lapse of time. On the contrary, in a case of the emulsion prepared using partially denatured yolk of Example 1, water separation is not observed after 5 hours time elapsed. These results clearly illustrate that the emulsion stability is remarkably improved compared with that of raw yolk.

TABLE 1

|  | Example 2 | Comparison |
|---|---|---|
| soybeans salad oil | 50.0 | 50.0 |
| water | 38.0 | 38.0 |
| denatured yolk of Exp. 1 | 5.0 | — |
| raw yolk | — | 5.0 |
| 10 wt % vinegar | 5.0 | 5.0 |
| salt | 2.0 | 2.0 |

Example 3

A custard cream is prepared by the standard procedure using 500 ml of milk, 150 g of sugar, 120 g of the partially heat denatured yolk and 50 g of wheat flour. For the comparison, a custard cream is prepared in a similar manner, except using raw yolk instead of the partially heat denatured yolk. The custard cream prepared by using the partially heat denatured yolk have a rich flavour, a delicious touch and taste and the characteristics of it is superior to that of the custard cream prepared by using raw yolk.

Example 4

A boiled egg paste is prepared by the standard procedure using 500 g of ground fish meat, 500 g of the partially heat denatured yolk and 100 g of starch. The obtained boiled egg paste has a good luster and color, and the raw odor of the ground fish paste is masked totally. This boiled egg has a good flavour.

Comparative Example 1

A yolk fluid is heat treated same to Example 1 except heated and maintained at the temperature of 63° C. The viscosity of the obtained yolk is slightly increased in comparison with raw yolk but not exceeding 300 centipoise and does not indicate a state of paste. The features of obtained yolk such as flavour, the masking ability and emulsifying ability are inferior to that of the partially heat denatured yolk of Example 1.

Comparative Example 2

A yolk fluid is heat treated in the same manner as Example 1, except heated and maintained at the temperature of 71° C. The obtained yolk is almost solidified, the viscosity of it is over than 300000 centipoise and it is insoluble in water. The flavour and the masking ability is inferior to that of raw yolk, especially the emulsifying ability is remarkably decreased compared to that of raw yolk.

Example 5

To 100 weight parts of the partially heat denatured yolk fluid prepared in Example 1, 50 weight parts of soybeans salad oil and 10 weight parts of 10 wt % vinegar is added and emulsified by means of TK homo-mixer (Tokushu Kiko industries Ltd.) at the rotating speed of 8000 rpm for two minutes. Thus the emulsion type emulsifier of the partially denatured yolk is prepared. The obtained emulsifier is characterized to be composed by oil drops having 2.5 $\mu$m average diameter. The emulsion stability of the obtained emulsion is observed. As the comparison, the experiment using raw yolk is carried out and emulsion stability of the obtained emulsion is observed too. That is, according to the composition and the proportional ratio (weight %) shown in table 2, an emulsion is prepared by means of TK homo-mixer (Tokushu Kiko industries Ltd.) at the rotating speed of 4000 rpm for two minutes. Just after the emulsification, the emulsion is filled up into a 100 ml measuring cylinder and settled. Then, the water separation is observed. The results are shown in FIG. 5.

TABLE 2

|  | Example 5 | Comparison |
|---|---|---|
| soybeans salad oil | 37.5 | 40.0 |
| water | 45.0 | 45.0 |
| denatured yolk of Exp. 1 | 8.0 | — |
| raw yolk | — | 5.0 |
| 10 wt % vinegar | 7.5 | 8.0 |
| salt | 2.0 | 2.0 |

The emulsions prepared using raw yolk have a tendency to increase the amount of water separation (proportion ratio of water separation to the total amount %) with the lapse of time. On the contrary, in a case of the emulsifier prepared using partially denatured yolk of Example 1 water separation is not observed after 8 hours time laps. These results clearly illustrate that the emulsion stability is remarkably improved compared with that of raw yolk.

Example 6

10 kg of a raw yolk fluid is filled up in a chamber of an apparatus in which an electric current can be applied and voltage is impressed same as to Example 1. In addition to applying an electric current, 1 kg of soybeans salad oil is added and stirred, and an O/W type emulsion is prepared. The temperature of 66° C. is maintained for 15 minutes and a preliminary partially heat denatured yolk emulsion is prepared. The viscosity of the emulsion is 2500 centipoise and a paste state having good water solubility are obtained. This emulsion has a creamy touch and taste and can be used as an emulsifier.

With continuous stirring of 100 weight parts of this primary emulsion, 36 parts of soybeans salad oil and 9 weight parts of 10% concentrated vinegar are added and preliminary emulsified. Then homogenized by means of a collidal mill (0.3 mm clearance, rotating speed 300 rpm) and an O/W emulsion type emulsifier can be obtained. The diameter of the average oil drop is 2.0 $\mu$m and has an excellent emulsifying ability. Using emulsifiers obtained by Example 5 and 6, mayonnaise is prepared according to the following mixing ratio. Namely, 5 wt % of alcohol vinegar, 7.5 wt % of sugar, 1.0 wt % of salt, 10 wt % of emulsifier of Example 5 or 6, 0.4 wt % of sodium glutamate, 3.0 wt % of starch and 33.1 wt % of water are mixed together and an aqueous phase is prepared. After 40 wt % of soybeans salad oil is added to the said aqueous phase and preliminary emulsified, homogenized by using homogenizer and the mayonnaise is prepared. 100 g of specimen is sampled from said two kinds of mayonnaise and put into bags of polyethylene. After frozen for 72 hours at −40° C., −30+ C., −20° C. and −15° C., defrozen and whether there is an oil separation is observed from the appearance. An oil separation can not be observed at any above mentioned freezing temperature. These results clearly indicates that the emulsifying power of above mentioned emulsifier are excellent. With respect to the solubility to the aqueous phase, the emulsifier of Example 6 is superior to that of Example 5.

Example 7

To the mixture of 60 weight parts of the partially denatured yolk of Example 1, and 8 weight parts of 10% concentrated synthetic vinegar and 32 weight parts of soybeans salad oil are added with constant stirring, then homogenized by a homogenizer (2 steps homogenizer 70 kg/cm$^2$+ 30 kg/cm$^2$) and an O/W type emulsion is prepared. Thus the emulsifier of this invention can be obtained. The average size of oil drops of this emulsifier is 1.5 $\mu$m.

Comparative Example 3

To 20 weight parts of the partially denatured yolk of Example 1, 80 weight parts of soybeans salad oil is added with constant stirring and homogenized by means of a homogenizer similarly to the method disclosed in Example 7.

According to the standard procedure, two kinds of mayonnaise are prepared using the emulsifiers prepared in Example 7 and Comparative Example 3. The emulsion stability (resistance to frozen/defrozen) of said mayonnaises prepared for trial are measured after freezing at −20° C. for three days and defreezing at the room temperature. And also the emulsion stability (resistance to heating) of said mayonnaises are measured after heated by water bath at 80° C. for 40 minutes and cooled to the room temperature. Comparative results are shown in table 3.

TABLE 3

| | mayonnaise prepared by | |
|---|---|---|
| resistance to | Example 7 | Comp. Example 3 |
| frozen/defrozen | not separated | completely separated |
| heating | not separated | completely separated |

Example 8

80 weight parts of the partially denatured yolk of Example 1 is controlled at the temperature of 40° C., 10 weight parts of hydrogenated soybeans oil (melting point 35° C.) maintained at 40° C. is added with constant stirring, further 10 weight parts of 10 wt % concentrated synthetic vinegar is added. Then by homogenizing by a homogenizer (clearance 0.3 mm, 3000 rpm) an O/W type emulsion is prepared, and thus the emulsifier of this invention can be obtained. The average size of oil drops of this emulsifier is 2.5 μm. By using this emulsifier, mayonnaise is prepared for trial according to the standard procedure. The obtained mayonnaise have a good emulsion stability to a freezing/ defreezing and to a heating.

Example 9

To the mixture of 40 weight parts of the partially denatured yolk of Example 1, and 8 weight parts of 10% concentrated synthetic vinegar and 52 weight part of rape-seed salad oil are added with constant stirring so as to preliminary be emulsified, then homogenized by a homogenizer (2 steps homogenizer 30 kg/cm² +20 kg/cm²) and an O/W type emulsion is prepared. Thus the emulsifier of this invention can be obtained. The average size of oil drops of this emulsifier is 2.5 μm. The obtained emulsifier is applied for the preparation of mayonnaise, and the obtained mayonnaise have a good emulsion stability to a freezing and to a heating.

Example 10

To the mixture of 40 weight parts of the partially denatured yolk of Example 1, 8 weight parts of 10% concentrated synthetic vinegar, and 2 weight parts of salt, and 50 weight parts of rape-seed salad oil are added with constant stirring so as to be preliminarily emulsified, then homogenized by a homogenizer (2 steps homogenizer 30 kg/cm² +20 kg/cm²) and an O/W type emulsion is prepared. Thus the emulsifier of this invention can be obtained. The average size of oil drops of this emulsifier is 2.5 μm.

By using the emulsifier of Example 9 and 10, O/W type emulsions are prepared according to the following proportion ratios. That is, 50 weight parts soybeans salad oil, 45 weight parts of water and 5 weight parts of the emulsifier of Example 9 or 10 are mixed together and emulsified by a TK homo-mixer according to the standard method. Each obtained emulsion is separated by a centrifuge for 10 minutes at the rotating speed of 6000 rpm and the water separation is observed. The water separation of an emulsion prepared using the emulsifier of Example 9 is 5% and that of Example 10 is 3%. It can be understood from these results that the emulsifier of Example 10 which mixes salt has a slightly better emulsifying ability.

What is claimed is:

1. A food additive comprising a water soluble paste of partially heat denatured yolk having a viscosity of 1500 to 7500 centipoise prepared by heating yolk fluid at a temperature in the range of 65° C. to 70° C. for at least five minutes.

2. The food additive of claim 1 containing mixed therewith at least 0.3 wt % vinegar or acetic acid, measured as acetic acid, based on the amount of said partially denatured yolk.

3. The food additive of claim 1 containing mixed therewith 5–10 wt % of salt, based on the amount of said partially denatured yolk.

4. The food additive of claim 1 containing mixed therewith at least 0.6 wt % vinegar or acetic acid, measured as acetic acid and 5–10 wt % of salt, based on the amount of said partially denatured yolk.

5. A food additive consisting essentially of a water soluble paste of partially heat denatured yolk having a viscosity of 1500 to 7500 centipoise prepared by heating yolk fluid at a temperature in the range of 65° C. to 70° C. for 5 to 30 minutes.

6. The food additive of claim 5 containing mixed therewith from 1 to 2 wt % of vinegar or acetic acid, measured as acetic acid, based on the amount of said partially denatured yolk.

7. The food additive of claim 5 containing mixed therewith 5–10 wt % of salt, based on the amount of said partially denatured yolk.

8. The food additive of claim 5 containing mixed therewith 1–2 wt % of vinegar or acetic acid, measured as acetic acid, and 5–10 wt % of salt, based on the amount of said partially denatured yolk.

9. An emulsifier for food comprising an oil/water emulsion prepared by emulsification of
(1) 30–95 weight parts of a water soluble paste of partially heat denatured yolk having a viscosity of 1500 to 7500 centipoise prepared by heating yolk fluid at a temperature in the range of 65° C. to 70° C. for at least 5 minutes, and
(2) 5–70 weight parts of oils and fats.

10. The emulsifier for food of claim 9 wherein the average diameter of the oil drops in the oil/water emulsion is smaller than 4 μm.

11. The emulsifier for food of claim 9 containing mixed therewith vinegar or acetic acid.

12. The emulsifier for food of claim 9 containing mixed therewith salt.

13. The emulsifier for food of claim 9 containing mixed therewith vinegar or acetic acid, and salt.

14. An emulsifier for food consisting essentially of an oil/water emulsion prepared by emulsification of
(1) 50–95 weight parts of a water soluble paste of partially heat denatured yolk having a viscosity of 1500 to 7500 centipoise prepared by heating yolk fluid at a temperature in the range of 65° C. to 70° C. for 5 to 30 minutes, and
(2) 5–50 weight parts of oils and fats,
wherein the average diameter of the oil drops in the oil/water emulsion are 1.5 to less than 4 μm.

15. The emulsifier for food of claim 14 containing mixed therewith 1 to 2 wt % of vinegar or acetic acid, measured as acetic acid.

16. The emulsifier for food of claim 14 containing mixed therewith 2 to 20 wt % salt.

17. The emulsifier for food of claim 14 containing mixed therewith 1 to 2 wt % of vinegar or acetic acid, measured as acetic acid, and 2 to 20 wt % salt.

18. A method for the preparation of a water soluble paste of a partially heat denatured yolk having a viscosity of 1500 to 7500 centipoise which method comprises uniformly heating a yolk fluid at a temperature of 65° C. to 70° C. for at least five minutes and recovering the water soluble paste.

19. The method for the preparation of a water soluble paste of claim 18 wherein the yolk fluid is mixed with at least 0.3 wt % of salt.

20. The method for the preparation of a water soluble paste of claim 18 wherein the yolk fluid is heated for 5 to 30 minutes.

21. The method for the preparation of the water soluble paste of claim 18, wherein the yolk fluid is heated by the direct application of an electric current to the yolk fluid.

22. The method for the preparation of the water soluble paste of claim 21, wherein the yolk fluid is heated between two electrodes by the direct application of an electric current through the electrodes to the yolk fluid.

* * * * *